United States Patent

Celestina-Krevh et al.

[11] Patent Number: 5,733,004
[45] Date of Patent: Mar. 31, 1998

[54] SHOULDER BELT GUIDE

[75] Inventors: Maryann C. Celestina-Krevh, Euclid; David Campbell, Westfield Center, both of Ohio

[73] Assignee: Century Products Company, Macedonia, Ohio

[21] Appl. No.: 738,387

[22] Filed: Oct. 25, 1996

[51] Int. Cl.$^6$ ................................................. A47C 1/08
[52] U.S. Cl. .................... 297/250.1; 297/483; 24/197; 24/200
[58] Field of Search .................... 297/483, 473, 297/250.1; 24/197, 200

[56] References Cited

U.S. PATENT DOCUMENTS

| | | | |
|---|---|---|---|
| 2,224,773 | 12/1940 | Shaulson | 24/200 |
| 2,269,696 | 1/1942 | Shaulson | 24/200 |
| 2,276,595 | 3/1942 | Shaulson | 24/200 |
| 4,236,755 | 12/1980 | Pollitt et al. | 297/483 |
| 4,461,510 | 7/1984 | Cunnignham et al. | 297/250.1 |
| 5,265,910 | 11/1993 | Barr et al. | 297/483 X |

FOREIGN PATENT DOCUMENTS 2216392  10/1989  United Kingdom ............... 297/483

*Primary Examiner*—Milton Nelson, Jr.
*Attorney, Agent, or Firm*—Graham & James LLP

[57] ABSTRACT

An improved shoulder belt guide for use with a child's booster seat positioned on a vehicle seat having a safety belt with a shoulder strap. The guide has first and second generally parallel slots formed in a body member with each slot having a belt access opening for enabling the shoulder strap to be attached to the guide. The guide has a third slot with closed perimeter, and a fourth slot generally parallel to the third slot but having an access opening enable the guide to be adjustably attached to one of a number of loops in a flexible securement strap attached to a booster seat. The strap is attached to the booster seat at several anchor points in order to provide one large loop and a series of small adjustment loops. The large loop portion of the securement strap passes through the third guide slot, while the smaller loops are engaged in the fourth parallel apertured slot so that the position of the guide is determined by which of the several small loops is received in the apertured parallel slot.

5 Claims, 2 Drawing Sheets

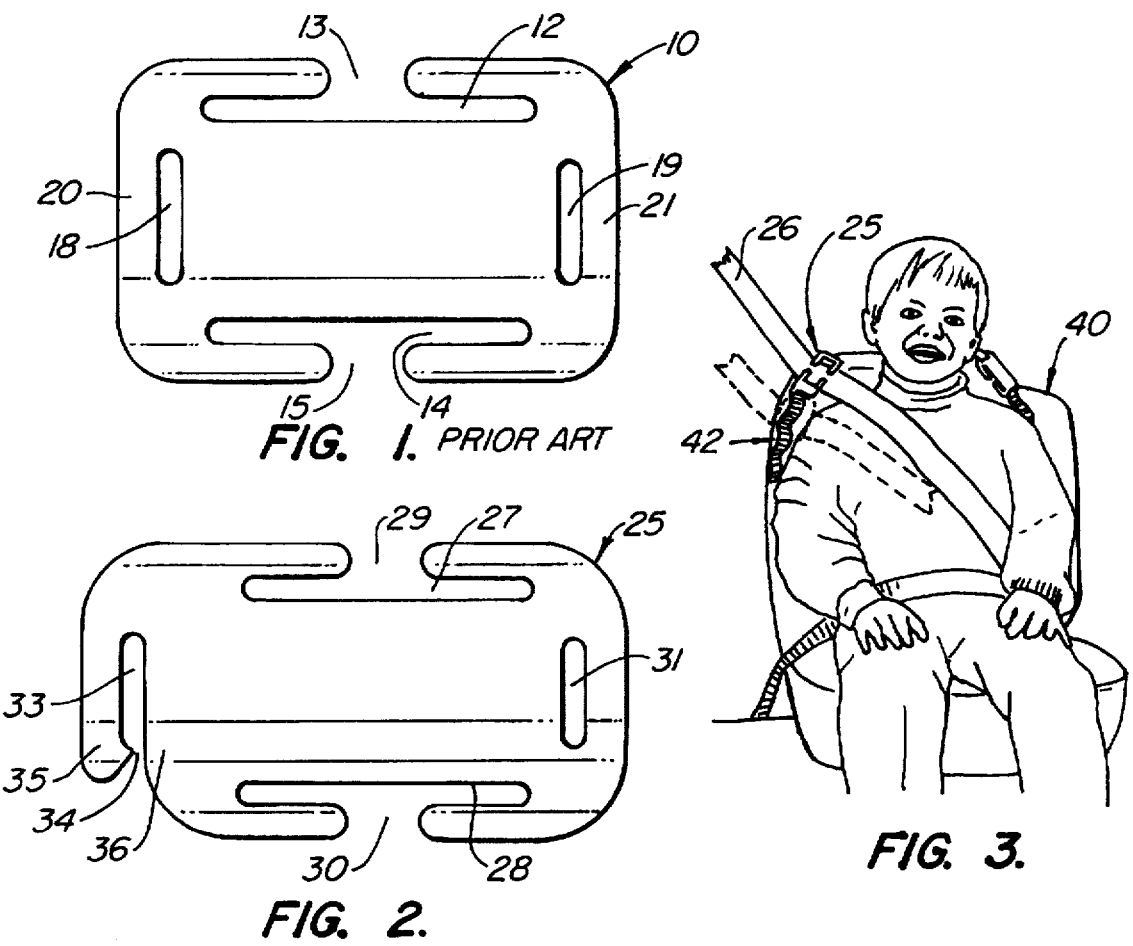
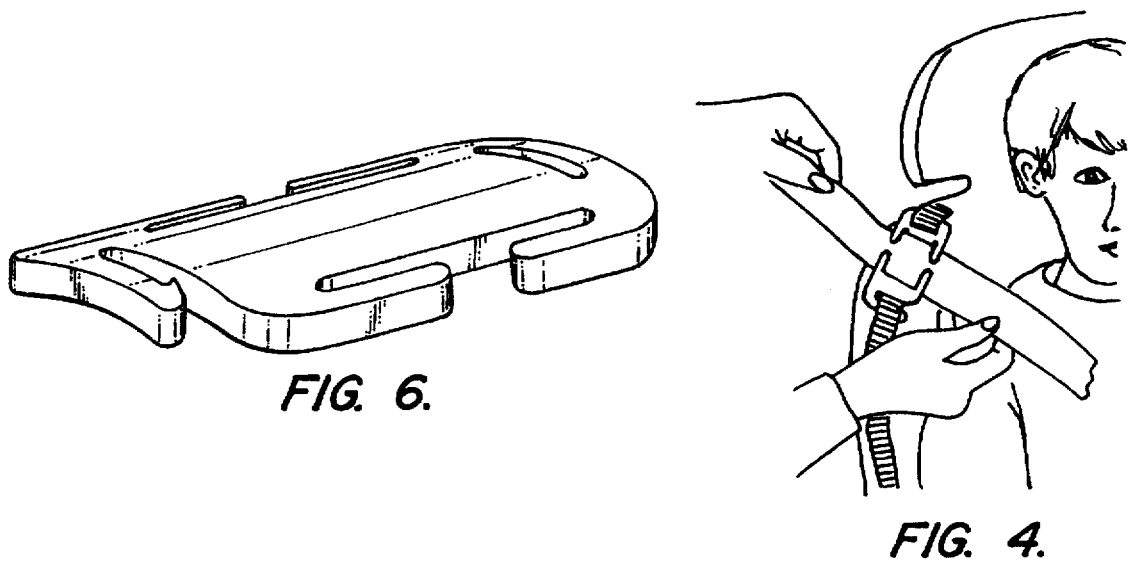

SHOULDER BELT GUIDE

BACKGROUND OF THE INVENTION

This invention relates generally to a shoulder belt guide for a child's booster seat, and more specifically to a shoulder belt guide that is adjustable diagonally along the seat so as to provide maximum comfort and safety.

For some number of years seat belts have been required for every passenger in automobiles manufactured for use in the United States. Such seat belts are commonly formed of a lap belt and an interconnected shoulder strap adapted to extend diagonally across the chest of the passenger. More particularly, the conventional shoulder strap is adapted to extend from an engaging buckle diagonally upwardly across the chest of the passenger and over the opposite upper arm to be secured to the upper side portion of the vehicle interior. As has been described in U.S. Pat. No. 5,275,468, such shoulder straps are designed to conform primarily to the anatomy of an adult passenger. As a consequence, when a child is seated in the vehicle, the shoulder strap is likely to extend across the child in an uncomfortable, ineffective, or dangerous position, even though the child is occupying a booster-type seat. U.S. Pat. No. 5,275,468 is directed to a plate adapted to draw the shoulder strap more closely to the lap belt, thereby spacing it from the child's upper shoulder and neck area. While such a device has obvious advantages, it can become detached and misplaced when not used, with the result that the child's comfort will only be maintained when the plate is actually available for use.

SUMMARY OF THE INVENTION

The invention comprises a shoulder belt guide for attachment to a child's booster seat in an adjustable fashion so that the diagonal angle of the conventional shoulder strap can be easily adjusted for maximum comfort and effectiveness.

The guide comprises a body member of sufficient strength to form part of a safety belt system and having first and second generally parallel slots formed in the body member, with each slot having a belt access opening. A third slot is formed in the body member generally perpendicular to the first and second slots, the third slot having a continuous closed peripheral edge. A fourth slot is formed in the body member generally parallel to the third slot, the fourth slot having an access opening. A third and fourth slots are preferably both substantially perpendicular to the first and second slots.

The access openings in the first and second slots of the body member are of sufficient size to enable a shoulder strap to be maneuvered into each slot. The third slot formed in the body member receives a first flexible loop in permanent sliding engagement, the flexible loop comprising a portion of a securement strap secured to a child's booster seat. The securement strap includes at least two other flexible loops for releasable engagement with the fourth slot through the access opening, so that the positioning of the fourth slot with respect to the other flexible loops enables the position of the body member to be adjusted in order to secure the shoulder strap in an optimum position away from the neck of a child.

The body member preferably has a curvature along the long axis to conform to the contour of the position of the child's booster seat on which the body member rests.

For a fuller understanding of the nature and advantages of the invention, reference should be made to the ensuing detailed description, taken in conjunction with the accompanying drawings.

BRIEF DESCRIPTION OF THE DRAWINGS

FIG. 1 is a plan view showing a prior art shoulder belt guide;

FIG. 2 is a plan view illustrating a first embodiment of the invention;

FIG. 3 illustrates placement of the shoulder belt guide on a child's booster seat;

FIG. 4 is an enlarged detailed view illustrating the shoulder belt in position in the guide;

FIG. 6 is a perspective view of an alternate embodiment of the invention.

DETAILED DESCRIPTION OF THE PREFERRED EMBODIMENTS

Figure 5:
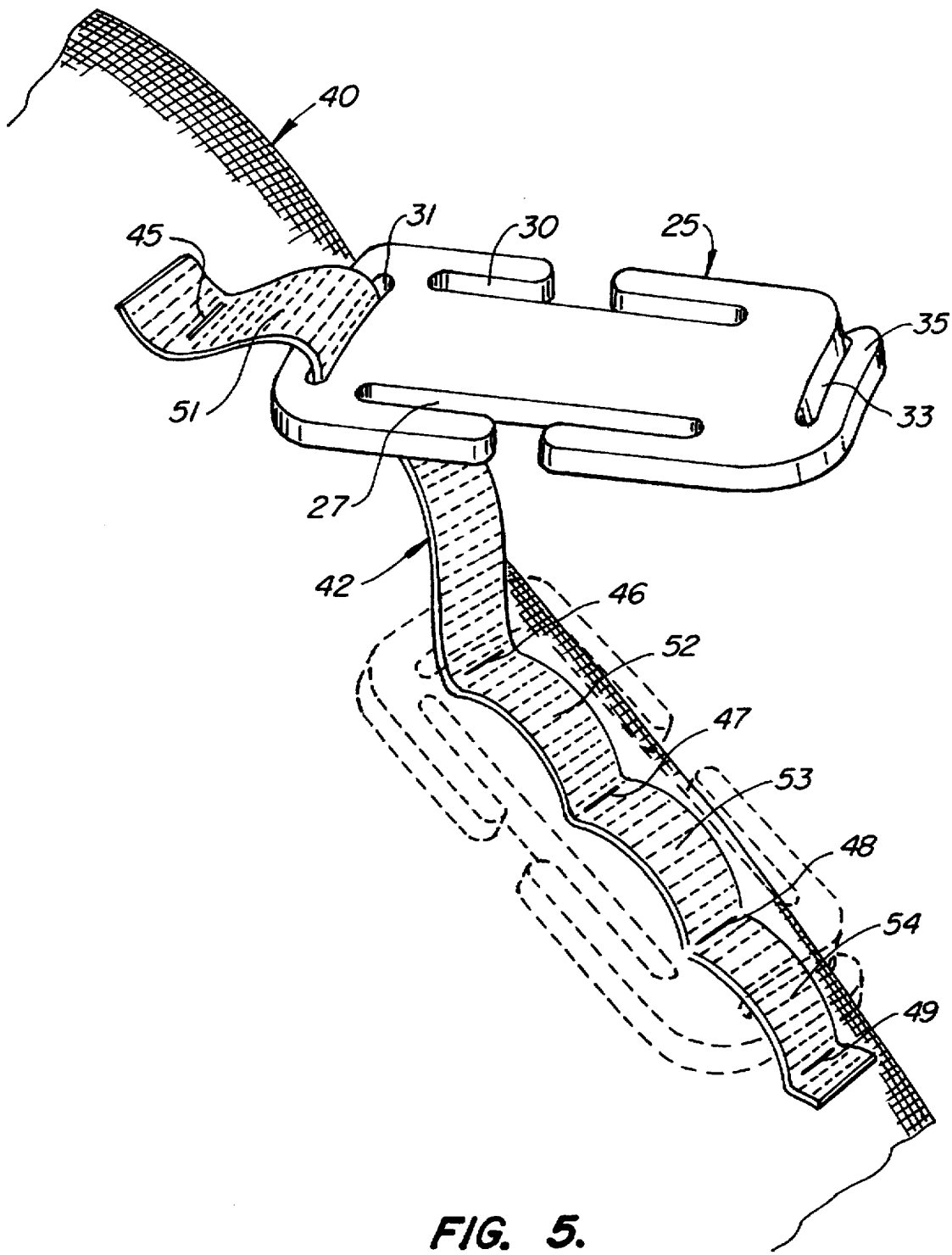
FIG. 5 is an enlarged perspective view illustrating the multiple adjustment loops.

Turning now to the drawings, FIG. 1 illustrates a prior art shoulder belt guide. As seen in this figure, the prior art guide, generally designated with reference numeral 10, is a unitary body member having first and second generally parallel slots 12, 14 formed inboard of opposite sides thereof with each slot 12, 14 having a central opening 13, 15 for enabling a shoulder strap to be maneuvered into the slot. Third and fourth slots 18, 19 each having a continuously closed peripheral edge 20, 21, respectively, are formed at the two remaining opposite side edges of guide 10. The purpose of slots 18, 19 is to accommodate a securement strap which is secured at the ends thereof to the child's booster seat in a relatively fixed position.

FIG. 2 illustrates a first embodiment of the invention in which the body member generally designated with reference numeral 25 is a flat unitary member. Guide 25 has a first and second pair of oppositely disposed generally parallel slots 27, 28 with central openings 29, 30 provided for the same purpose as slots 12, 14 of the prior art device: viz. to permit installation of a shoulder strap of an automobile safety belt system into each slot. Guide 25 has a third slot 31 with a continuous closed peripheral edge; and a fourth slot 33 with an access opening 34. Access opening 34 is formed as a gap between an inwardly turned jaw tip 35 and the adjacent peripheral surface 36 of guide 25. The purpose of apertured slot 33 is to enable adjustable positioning of guide 25 on the child's booster seat in the manner described below.

With reference to FIGS. 3–5, guide 25 is adjustably mounted on an upper corner portion of the back of a child's booster seat 40 by means of a series of loops formed in a mounting strap generally designated with reference numeral 42. As best shown in FIG. 5, mounting strap 42 is a continuous web secured at one end to a first anchor point 45 on the shoulder of child's booster seat 40, and secured at a succession of additional anchor points 46–49 adjacent the upper corner portion of booster seat 40. The lengths of strap 42 between the anchor points 45–49 thus form a series of closed loops, including a first relatively larger loop 51 and a plurality of smaller loops 52–54. Large loop 51 has sufficient length to enable guide 25 to be positioned so that any one of smaller loops 52–54 may be received in apertured slot 33. In this way, the relative position of guide 25 along the length of securement strap 42 can be adjusted along the corner of the child's booster seat 40 to any one of several positions. FIG. 3, for example, illustrates the guide in a first position in lines drawn in full, and in a second position in broken lines.

Securement strap 42 is attached to the corner of child's booster seat 40 in any suitable fashion, such as by stitching, riveting or the like. To install, one of the two ends of strap 42 is first secured to the seat 40. Preferably, the end of strap 42 remote from the large loop 51 to be formed is first secured at anchor point 49, and then strap 42 is successively secured to anchor points 48, 47 and 46. The free end of strap 42 is then passed upwardly through closed slot 31 of guide 25, after which the end of strap 42 is secured at anchor point 45.

In use, the relative position of guide 25 is adjusted by releasing strap 42 from slot 33, adjusting the position of guide 25 by sliding the strap 42 through slot 31 to the appropriate position, and then engaging the appropriate one of loops 52–54 in slot 33 by maneuvering jaw 35 laterally of the strap 42 at the appropriate loop location.

Once the position of guide 25 has been fixed, the shoulder strap 26 is maneuvered into apertured slots 27, 28 and adjustably positioned, as necessary, longitudinally of strap 26.

FIG. 6 illustrates a preferred embodiment of the invention in which the guide 25 has a curved configuration which conforms to the curvature of that portion of the booster seat 40 on which the guide 25 rests. Guide 25 is fabricated from a material providing sufficient strength to comply with the requirements for a safety belt system. The preferred embodiment is fabricated from a polypropylene material.

As will now be apparent, the invention provides a simple yet effective adjustment mechanism for enabling the diagonal position of a shoulder strap to be adjusted to provide a comforting fit with the individual wearing the belt. In particular, it is noted that the diagonal position adjustment may be made after the shoulder strap 26 has been attached to the guide 25, if desired, in order to provide the optimal diagonal position for the shoulder strap: i.e., one in which the strap does not engage the neck of the wearer or does not fall off the shoulder.

While the above provides a full and complete disclosure of the preferred embodiments of the invention, various modifications, alternate constructions and equivalents may be employed, as desired. For example, while the invention has been shown and described with reference to essentially rectangular geometry, other geometrical configurations may be employed, as desired. In addition, while the invention has been described and illustrated with respect to three adjustment loops, more loops may be provided, if desired, in order to provide a wider range of diagonal adjustment. In addition, although the loops have been described and illustrated formed from one continuous length of strap material, other loop configurations may be employed, such as individual fabric loops formed from separate, discrete sections, or other forms of loops. Therefore, the above description and illustrations should not be construed as limiting the scope of the invention, which is defined by the appended claims.

What is claimed is:

1. A child's booster seat adapted to be positioned on a vehicle seat having a safety belt with a shoulder strap, said booster seat including a strap guide comprising:

a body member of sufficient strength to form part of a safety belt system;

first and second generally parallel slots formed in said body member, each slot having an access opening;

a third slot formed in said body member, generally perpendicular to said first and second slots, said third slot having a continuous closed peripheral edge;

a fourth slot formed in said body member, generally parallel to said third slot, said fourth slot having an access opening;

said access opening in each of said generally parallel first and second slots being of sufficient size to permit introduction of said shoulder strap;

said child's booster seat having a flexible loop for permanent engagement with said third slot; and said child's booster seat further having at least two other flexible loops for adjustable engagement with said fourth slot wherein the positioning of said fourth slot along said other flexible loops enables said body member to position said shoulder strap away from the child's neck.

2. A child's booster seat in accordance with claim 1, wherein said flexible loops are formed from a continuous mounting strap.

3. A child's booster seat in accordance with claim 1 wherein the flexible loop for permanent engagement with said third slot is larger than said at least two other loops.

4. A child's booster seat in accordance with claim 1 wherein said body member is curved to conform to the curvature of said booster seat where said body member is positioned.

5. A child's booster seat in accordance with claim 1 wherein the body member is formed of polypropylene.

* * * * *